June 25, 1968 J. WERNER ETAL 3,389,579
SHAFT GUIDED IN A PROTECTION TUBE
Filed April 1, 1966 2 Sheets-Sheet 1
FIG. 1.
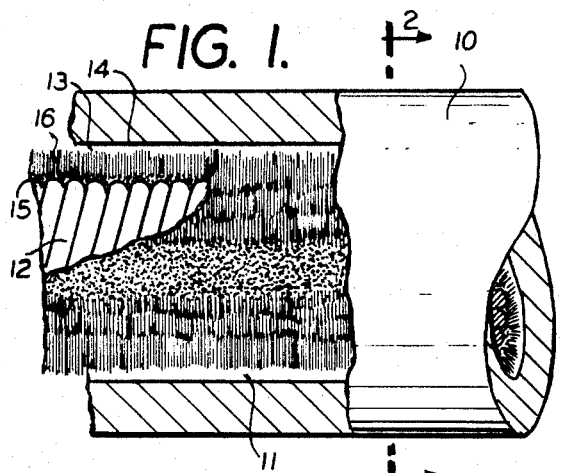
FIG. 2.
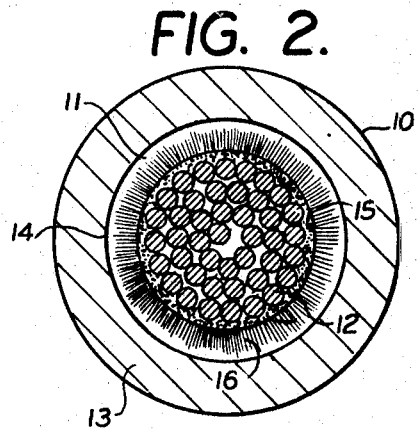
FIG. 3.
FIG. 4.
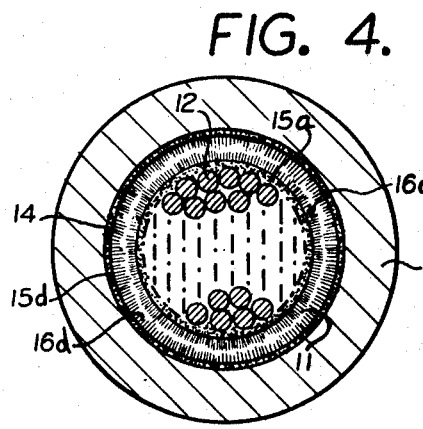
FIG. 5.
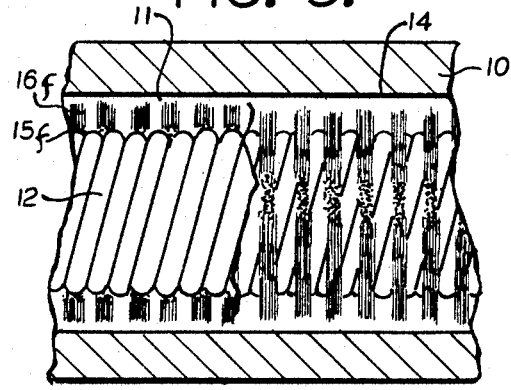
FIG. 6.
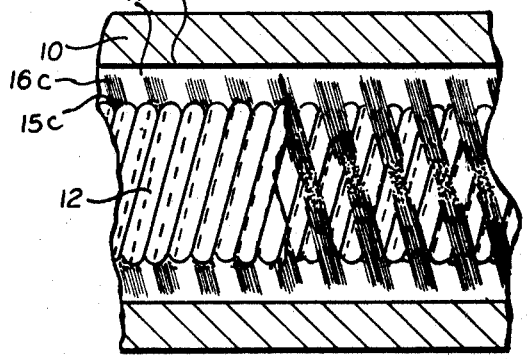
FIG. 7.
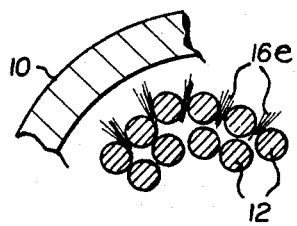
INVENTORS
JOHANNES WERNER
HANS GOLDE
HORST SCHLICK
BY
ATTORNEY.

June 25, 1968   J. WERNER ET AL   3,389,579
SHAFT GUIDED IN A PROTECTION TUBE

Filed April 1, 1966   2 Sheets-Sheet 2

INVENTORS
JOHANNES WERNER
HANS GOLDE
HORST SCHLICK
BY
ATTORNEY.

United States Patent Office 3,389,579
Patented June 25, 1968

3,389,579
SHAFT GUIDED IN A PROTECTION TUBE
Johannes Werner, Offenbach am Main, and Hans Golde and Horst Schlick, Frankfurt am Main, Germany, assignors to VDO Tachometer Werke Adolf Schindling G.m.b.H., and H. T. Golde G.m.b.H., Frankfurt am Main, Germany, both corporations of Germany
Filed Apr. 1, 1966, Ser. No. 539,495
Claims priority, application Germany, Apr. 2, 1965, V 28,191
9 Claims. (Cl. 64—2)

ABSTRACT OF THE DISCLOSURE

A power transmission device, and a method for making same, comprising an outer protective tubing means having a bore, shafting means extending through the bore and having an outside diameter less than the inside diameter of the bore in the tubing means providing an interspacing therebetween, positioning means for maintaining the shafting means out of contact with the tubing means, and the positioning means comprises at least one layer of a plurality of discrete, elongated resilient elements projecting substantially radially in its elongated dimension relative to the shafting means or the tubing means and disposed in said interspacing in spaced relationship.

---

This invention relates to improvements in the construction of power transmission devices, such as flexible shafts extending through protecting tubing.

An object of the invention is to provide a novel and improved flexible power transmission shaft in which the construction is such as to prevent or minimize the radial play or movement of the shaft within its protecting tubing.

Another object of the invention is to provide a novel and improved flexible power transmission shaft in which the construction is such as to prevent or minimize direct contact of the flexible shaft with its protective tube and thus to minimize the effects of friction, such as heating up and of noise.

A further object of the invention is to provide a novel and improved flexible power transmission shaft, the construction of such shaft and its protective tubing being so arranged as not to interfere with any desired degree of flexibility of the tubing or of its enclosed flexible shaft.

Still another object of the invention is to provide a novel and improved construction of flexible shaft extending through a protective tube in which the lessening of friction is so great as to permit the protective tube to be made of substitute material rather than of metal, as heretofore.

Still a further object of the invention is to provide a novel and improved construction of shafting and enclosing protective tubing in which the need for supplemental lubrication of the interior of the tubing is minimized considerably or even avoidable.

Another object of the invention is to provide a novel and improved construction of flexible shafting and enclosing protective tubing, in which the extension or lengthening of the flexible shaft or of the tubing is substantially minimized or eliminated due to avoidance of excessive heating from frictional contact betwen the flexible shaft and its protective tubing.

Another object or the invention is to provide a novel and improved construction of flexible shaft contained within a protective tube in which a plurality of fine fibers are secured by electrostatic means to the surface of the flexible shafting itself, so as to extend radially therefrom and forming a buffer or spacing element or coating supplemental to and carried on the flexible shafting, so as to provide a peripheral continuous spacer between the flexible shaft and the enclosing protective tubing, thus maintaining the centralization of the shafting within the tubing.

Another object of the invention is to provide a novel and improved construction of protective tubing and enclosed flexible shafting in which a large number of relatively short fibers are caused to adhere to the surface of the flexible shafting, so as to project radially therefrom and to the interspace between the flexible shafting and its protective tubing, there being a layer of adhesive material applied to the outer surface of the flexible shafting and electrostatic means providing a flux field for radially aligning the fibers about and on the surface of the flexible shafting, so as to adhere and being engaged with the adhesive matrix layer itself, so as to be held firmly therein in radial or substantially radial positions.

Still another object of the invention is to provide a novel and improved construction of flexible shafting extending through a protective tubing in which there is a coating of adhesive material laid upon the interior surface of the protective tubing and wherein electrostatic field producing means is employed to flock thereupon a large number of relatively short elongated fibers, so that they stand out therefrom in radially inward disposition extending thus toward the outer surface of the flexible shafting, so as to extend into the interspace therebetween and thus to minimize any shifting of the shafting from concentricity or coaxiality with the protective tubing.

Another object of the invention is to provide a novel and improved construction of flexible shafting and protective tubing therefor in which electrostatic means is employed to produce a flux field for the radial alignment of a first layer of radially outwardly projecting fibers in a brush-like layer adhesively secured to the outer surface of the flexible shaft and for producing a second layer also brush-like in form and formed of a multiplicity of short flexible fibers which are caused by electrostatic means to adhere to an adhesive layer carried on the interior surface of the protective tubing, so that both brush-like layers contribute to provide a constraining force maintaining the centering positioning of the flexible shafting within its protective tubing and for minimizing rubbing and consequent production of unwanted noise due to such frictional contact, and also to minimize heating up which would normally result when such shafting and tubing are brought into continuous rubbing contact.

It is a further object of the invention to provide a novel and improved construction of flexible shafting and protective tubing with layers of brush-like fibrous material extending inwardly from the inner surface of the protective tubing or outwardly from the surface of the flexible shafting along both the tubing and the shafting and wherein such brush-like fibrous layers may be emplaced either so as to continuously cover the surfaces that they are attached to or can be laid on in spiral ring form with spaces between adjacent turns or in angular rings positioning with separating spaces therebetween, thus minimizing the quantity of fibers which are employed depending on the particular constructional needs of the shafting and tubing.

Another object of the invention is to provide a novel and improved construction of flexible shafting and protective tubing, which can be produced by mass production methods continuously and without the need for use of skilled labor and at low cost.

Still another object of the invention is to provide a novel and improved construction of flexible shafting and protective tubing, which is adaptable for use for power transmission either for pulling or for pushing or for rotation, and in which, especially where the device is to be used for pushing, the construction of the protective tubing and of the flexible shafting can be regulated as to give it almost any degree of stiffness, as desired for the purpose at hand.

With these and other objects in view which will become apparent in the following detailed description, the present invention will be clearly understood in connection with the accompanying drawings, in which:

FIGURE 1 is a side view of a length of the composite protective tubing and inner shaft in a short section thereof, the view being partly broken out to show the construction of a first preferred form thereof with fibers on the shafting;

FIG. 2 is a transverse sectional elevational view taken substantially on plane 2—2 of FIG. 1;

FIG. 3 is a transverse sectional elevational form of a slightly different construction and taken on a plane similar to that of FIG. 2, but showing fibers on the protective tube itself;

FIG. 4 shows another modified form taken on a plane substantially the same as FIG. 2 and in transverse elevational section with fibers carried by both the shafting and the protective tubing;

FIG. 5 is a view similar to that of FIG. 1, but showing a further modified form of the invention with the fibers mounted on the shafting on preformed annular rings therealong;

FIG. 6 is a view similar to that of FIG. 5, but showing a further modified form of the invention, in which the fibers are mounted on a spirally laid continuous adhesive carried by the shafting;

FIG. 7 is a transverse sectional elevational view similar to that of FIG. 2 and showing a further modified form of the invention.

Figure 8:
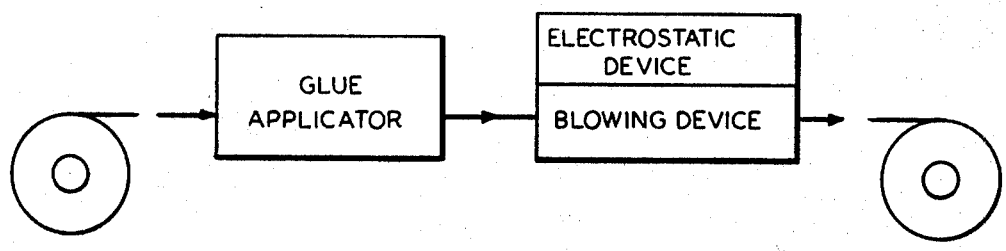
FIG. 8 is a block diagram disclosing the manufacturing process.

In connection with the use of power transmission devices for machinery, automobiles and other applications, the flexible shafts have come into considerable use and such flexible shafts may be made of wire wound materials, for example, spirally wound to any length desired for connection from a driving source to a driven source. In order to protect such flexible power shafts against damage, it has been customary to enclose them in an outer protective tubing through which they extend and which is of slightly greater diameter internally than the outer diameter of the flexible shafting. Various problems have accordingly arisen in connection with use of such shafts and one of the main problems has been the avoidance of radial play of the shaft, that is to say, its movement out of axial concentricity with the protective tubing. When this has happened, there is also a considerable rubbing and friction with wearing of the protective tubing and also of the flexible shafting, and in addition to that, the resulting production of loud and unwanted noise from the frictional contact and rubbing.

Such flexible shafts running through protective tubes are employed for various purposes, such as for example, rotation of a driven member by a driving member, or pulling one member by another member or pushing, these being various forms of transmission of power from one point to another, in which flexible shafting has found considerable utility. Such flexible power transmission shafts may be made of one or more layers of metal wires, spirally wound and where more than one layer is used, these layers are placed one over the other, and similarly, the protective tubing may be formed of spirally wound metal or may be formed of other substitute materials including plastics which are well known in the art.

In order to minimize friction between the shaft and the protective conduit tube, resort has been had to various expedients, such as inserting a layer of some substitute or fabricated material over the shaft of affixing the same on the inside of the flexible protective tube in order to avoid the friction and in addition, various types of lubricating coatings have been employed for this purpose and also for the purpose of damping out the resultant noise.

Other measures have been tried for reducing noise, such as for example, the interruption of the shaft or the protecting tube by use of a sound silencing intermediate element connected thereto.

As the need became greater and greater for avoiding noise, it became necessary to use means of one kind or another, even more than before to damp out friction between the shafting and its containing tube, thus to damp out the nose. However, little success has been achieved in this direction, especially in motor vehicles, where there is a demand for the utmost possible freedom from noise and where such flexible shafting is employed for driving the speedometer drive shafts, and the shafts used for operating the windows and for operating the movable roofs of cars and for other purposes in automobiles.

Tubes made of other materials, such as plastics, compositions, and the like, show themselves to be of insufficient use in avoiding noise. Besides tubing made of such materials have undergone great change in length under changes in temperature and also influx of moisture. For those speedometer cables which are continuously driven, protective tubing of such materials are also insufficient to withstand the intense build-up of heat from friction and have been found to be generally unsatisfactory. The flexible cables for windows, slidable roofs of cars may be conducted in slots or tin pipes forming part of the body and rub in these, causing friction. In devising means to avoid noise and rubber, space considerations must also be taken into account and it has been found that by use of prior expedients some noise diminution could take place, but only when the size of the protective tubing was so far increased as to take up too much space and still, nevertheless, even this does not afford any sufficient degree of freedom from noise.

This invention provides for a completely noise-free extension of a flexible shaft through a protective tube, in which there is fastened on the shaft and/or on the inside of the protective tubing a soft, elastic, springy brush-like layer, for example, a layer made of a great many of short elastic fibers. Such fibers are carried either on the shaft or on the protective pipe and project radially therefrom being secured thereto by a layer of adhesive material which holds them firmly in position in radial position or substantially radially.

In one embodiment of the invention, there is placed a layer of very strong adhesive material on the shaft and/or on the inside of the protective tube and on the adhesive layer there are deposited by electrostatic means, a large number of short fibers which may also be arranged in ring formation. By means of the brush-like layer thus formed between the shaft and the protective tube, the shaft is moved into radially central position within the tubing, and this brush-like layer thus blocks every contact between the shaft and the tube and hence also blocks production of every resulting noise, which would otherwise result from frictional rubbing therebetween.

As seen in the drawings, particularly FIGS. 1 and 2, there is a flexible cylindrical tubing 10 formed of any suitable flexible material well known in the art, either of metal rings or spirally wound, with adjacent coils engaged with each other flexibly, or of other materials. Thus flexible protective tubing 10 has a bore 11 formed therethrough and extending throughout its entire length. Inside the bore 11 there is disposed a flexible shafting 12 which may be of any well known or conventional type, such as for example, being made of superposed layers of wire spirally wound for strength and flexibility. As the outside diameter of the shafting 12 is slightly less than that of the inside diameter of the protective tubing 10, there is normally an interspacing in cylindrical form as at 13, between the inner surface 14 of the flexible tubing and the outer surface of the flexible shafting 12.

If, as used, the flexible shafting is always maintained in concentric position axially to the bore of the tubing 10, then there can be no rubbing or friction therebetween and consequently no unwanted noise. However, when the shafting rubs up against the tube inner surface 14, then there is wear and considerable noise.

The present invention provides means for maintaining the spacing between the outer surface of the flexible shafting 12 and the inner surface 14 of the protective tubing. For this purpose, according to one embodiment of the invention, there is laid on the outer surface of the flexible shafting 12, a relatively thin layer 15 of a quick-hardening adhesive or glue material. A great many short elastic fibers 16 are to be set into the adhesive layer, so as to project radially therefrom. In order to accomplish this, the flexible shafting 12 with its coating of adhesive, is led through an apparatus in which there is a very strong electromagnetic field for electrostatically flocking the fibers radially onto the shaft 12. The fibers are blown into the space in the apparatus, where they are brought under the influence of the electrostatic flux force and are so charged as to align themselves with the radial magnetic field flux lines, being so drawn onto the shaft 12 and they remain stuck firmly in the adhesive layer 15 in a radial or substantially radial position, being then secured firmly upon the shaft by means of the quick-hardening adhesive.

Instead of the continuous brush-like arrangement of fibers, the length, strength and material of which may be selected suit the loading and working conditions to which the shaft is subjected, it is also possible to use instead, a greater or lesser number of short annular brush-like ring sections, which are also fiber-coated and are mutually spaced from each other. The brush-like layer 16 of fibers can also be made by so orienting fibers or such ring section of fibers between the wire windings of the coil made of the flexible shaft and thus to assume the orientation of the spiral winding of the shafting.

If the adhesive layer 15c, as seen in FIG. 6, is laid on the shafting 12, not in the continuous layer, but rather in the form of a spiral or screw-like band 15c, or as seen in FIG. 5 in the form of a series of spaced annular rings at 15f, then these layers of adhesive can also be flocked by means of electrostatic apparatus, forming a brush-like layer 16c in the form of a spiral winding, as seen in FIG. 6, or a series of brush-like layers 16f, in the form of spaced rings, as seen in FIG. 5. It has been seen that this results in a considerable saving of fibrous flock material, due to the interspacing and may be employed when there is not too much stress on the shafting in use.

As seen in FIG. 3, here is a modified form in which an adhesive layer 15b is placed upon the inside surface of the protective tubing 10, and the fibers 16b are electrostatically deposited in the adhesive layer in the same manner as previously described, but so as to project substantially radially inwardly toward the surface of the flexible shafting 12.

FIG. 4 shows another modified form of the invention, which combines the features of FIGS. 2 and 3 in that the flexible shafting 12 has affixed to it a brush-like layer of radially outwardly projecting fibers 16a, embedded in the layer of adhesive 15a thereon. At the same time, it is seen from FIG. 4, that a brush-like layer of fibers 16d is affixed in radially inwardly projecting disposition to the inner surface of the protective tube 10, being seated in the adhesive lining 15d, both brush-like layers of fibers being placed and positioned by the same means, namely the electrostatic flux, described herein above.

Referring now to FIG. 7, it is seen that here is a further modified view, with the flexible shafting 12, being provided with a large number of radially outwardly projecting fibers 16e, which extend between and through the interspacing of adjacent wires which make up the winding of the flexible shafting, these being also subjected to electrostatic flux means, so as to project radially outwardly and thus being arranged in spiral form and will be to some extent frictionally and mechanically held between adjacent wires. However, in this form resort may also be had for additional adhesion to use of a suitable adhesive impregnated or soaked in between the wire layers to hold the fibers even more firmly in place.

The brush-like layer between the shaft and the protective tube, provides the achievement of a soft elastic springy guidance of the shaft in the protective tubing and prevents all contact between the material of the shaft and the protective tube. The arrangement is practically totally noise-free and the brush-like layer can be disposed either on the shaft or on the inside of the protective tube or in both places. Supplemental lubricant is not needed and can be dispensed with. However, in some cases where the shafts are running very, very fast, it may be useful that a small quantity of light oil lubricant or a molybdenum sulphide lubricant be used.

While we have disclosed several embodiments of the present invention, it is to be understood that these embodiments are given by example only and not in a limiting sense, the scope of the present invention being determined by the objects and the claims.

We claim:

1. A power transmission device comprising:

two concentrically disposed members, one of said members comprising an outer protective tubing means having a bore, the other of said members comprising:

shafting means extending through said bore and having an outside diameter less than the inside diameter of said tubing means bore, to provide an interspacing between said members, positioning means for maintaining said shafting means out of touching contact with said protective tubing means, said positioning means comprising:

at least one layer of a plurality of discrete elongated resilient elements projecting substantially radially in its elongated dimension relative to one of said members and disposed in spaced relationship in said interspacing.

2. A power transmission device, as set forth in claim 1, and wherein:

said plurality of discrete elongated resilient elements are carried by said shafting means and project substantially radially from and beyond its surface, and adhesive matrix means carried on and secured to said shafting means surface, and forming a base into which said resilient elements are all firmly held at one end so as to project therebeyond.

3. A power transmission device as set forth in claim 1, and wherein:

said plurality of discrete elongated resilient elements constitute fibers carried by said shafting means and projecting substantially radially from and beyond its surface and forming a brush-like layer at least incompletely filling the space between said tubing means and said shafting means, and adhesive matrix base means disposed on and adhered to the surface of said shafting means, said brush-like layer of fibers being partly adhesively embedded in said base means, whereby their substantially radial disposition is maintained, and whereby they block contact between said shafting means and said tubing means.

4. A power transmission device as set forth in claim 1, and wherein:

said plurality of discrete elongated resilient elements are carried by said protective tubing means and project substantially inwardly from the surface of its said bore, and securing means carried on said bore surface and forming an adhesive bed in which one end of said resilient elements is adhesively securely held, whereby contact between said shafting means and said tubing means is blocked by said projecting resilient elements.

5. A power transmission device as set forth in claim 1, and wherein:
said at least one layer comprises:
a first layer of some of said plurality of discrete elongated resilient elements carried by said protective tubing means and projecting substantially radially inwardly from and secured to the inner surface of its said bore, and
a second layer of the remainder of said plurality of discrete elongated resilient elements carried by said shafting means and projecting substantially from and secured to its surface,
said resilient elements are fibrous,
whereby said first and second layers of fibrous elements project into the interspace between said tubing means and shafting means to at least incompletely fill said interspace and block said shafting means from contact with said tubing means.

6. A power transmission device as set forth in claim 1, and wherein:
said plurality of discrete elongated resilient elements disposed in a continuous spiral array extended around and along the surface of said shafting means with spacing between the turns of said spiral array,
said resilient elements all projecting substantially radially outwardly from and secured to the surface of said shafting means, and for blocking contact of said shafting means with said tubing means.

7. A power transmission device as set forth in claim 1, and wherein:
said plurality of discrete elongated resilient elements are disposed in a plurality of mutually spaced annular rings each extending around and secured to said shafting means, and
said resilient elements all projecting substantially radially outwardly from and secured to said shafting for projecting into the interspace outwardly of said shafting means toward said tubing means, and blocking contact between said shafting means and tubing means.

8. A power transmission device as set forth in claim 3, and wherein:

said shafting means is formed of a plurality of spirally wound wires, and wherein
said plurality of discrete elongated resilient elements constitutes fibrous elements extending at their inner ends in between adjacent ones of said wires and secured therebetween so as to project substantially radially outwardly therefrom toward the inner surface of said protective tubing bore, and
whereby contact between said shafting means and said tubing means is blocked by the intervening said fibrous elements.

9. The process of making a self centering flexible cable device in which there is a flexible cable extensible through the bore of a protective tubing, comprising the steps of:
placing said flexible cable under electrostatic influence so that lines of flux radiate therethrough in substantially radial direction,
feeding a plurality of discrete elongated flexible fibers into proximity to said cable, so that said fibers are subjected to said electrostatic flux field and are caused to assume alignment with the flux lines of force, and to be brought against the said shaft while retaining their said radial orientation, and
securing said fibers to said shaft in said radial orientation, so as to project radially in the elongated direction outwardly therefrom.

References Cited

UNITED STATES PATENTS

| | | | |
|---|---|---|---|
| 2,382,966 | 8/1945 | Arens | 74—501 |
| 2,527,501 | 10/1950 | Saks | 117—17 X |
| 2,573,361 | 10/1951 | Rodgers et al. | 64—2 |
| 2,592,602 | 4/1952 | Saks | 117—17 X |
| 2,821,092 | 1/1958 | Cordora et al. | 74—501 |
| 3,085,406 | 4/1963 | Hanebuth | 64—2 |
| 3,204,480 | 9/1965 | Bradbury. | |
| 3,261,225 | 7/1966 | Crouse | 64—2 X |

FOREIGN PATENTS

| | | |
|---|---|---|
| 479,254 | 12/1951 | Canada. |
| 1,294,854 | 4/1962 | France. |

HALL C. COE, *Primary Examiner.*